(12) United States Patent
Halalay et al.

(10) Patent No.: US 7,622,216 B2
(45) Date of Patent: Nov. 24, 2009

(54) SUPPORTS FOR FUEL CELL CATALYSTS

(75) Inventors: Ion C. Halalay, Grosse Pointe, MI (US); Belabbes Merzougui, Warren, MI (US); Michael K. Carpenter, Troy, MI (US); Swathy Swathirajan, West Bloomfield, MI (US); Gregory C. Garabedian, Warren, MI (US); Andrew M. Mance, Royal Oak, MI (US); Mei Cai, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 345 days.

(21) Appl. No.: 11/415,358

(22) Filed: May 1, 2006

(65) Prior Publication Data
US 2006/0246344 A1 Nov. 2, 2006

Related U.S. Application Data

(60) Provisional application No. 60/676,712, filed on May 2, 2005.

(51) Int. Cl.
*H01M 4/00* (2006.01)
*B01J 27/22* (2006.01)

(52) U.S. Cl. .......................... 429/42; 429/44; 502/177

(58) Field of Classification Search ................ 429/44, 429/42; 502/101, 177
See application file for complete search history.

(56) References Cited

U.S. PATENT DOCUMENTS

| | | | | |
|---|---|---|---|---|
| 3,346,421 | A * | 10/1967 | Thompson et al. | ............ 429/42 |
| 4,362,790 | A * | 12/1982 | Blanchart et al. | ............ 429/42 |
| 4,795,684 | A * | 1/1989 | Jalan et al. | ............ 429/44 |
| 5,316,871 | A * | 5/1994 | Swathirajan et al. | .......... 429/33 |
| 6,297,185 | B1 * | 10/2001 | Thompson et al. | .......... 502/101 |
| 2005/0037212 | A1 | 2/2005 | Budinski | |

* cited by examiner

*Primary Examiner*—Patrick Ryan
*Assistant Examiner*—Thomas H. Parsons
(74) *Attorney, Agent, or Firm*—Reising Ethington P.C.

(57) ABSTRACT

The durability of a fuel cell having a polymer electrolyte membrane with an anode on one surface and an oxygen-reducing cathode on the other surface is improved by substituting electrically conductive titanium carbide or titanium nitride particles for carbon particles as oxygen-reducing and hydrogen-oxidizing catalyst supports. For example nanosize platinum particles deposited on nanosize titanium carbide or titanium nitride support particles provide good oxygen reduction capability and are corrosion resistant in an acid environment. It is preferred that the catalyst-on-titanium carbide (nitride) particles be mixed with non-catalyst-bearing carbon in the electrode material for improved electrode performance.

10 Claims, 3 Drawing Sheets

SUPPORTS FOR FUEL CELL CATALYSTS

CROSS-REFERENCE TO RELATED APPLICATION

This application claims the benefit of U.S. Provisional Application 60/676,712 filed May 2, 2005 and titled "Supports for Fuel Cell Catalysts."

TECHNICAL FIELD

This invention pertains to low temperature acid and alkaline fuel cells such as the ones employing a solid polymer electrolyte membrane in each cell with catalyst containing electrodes on each side of the membrane. More specifically, this invention pertains to a catalyst support material for such cells.

BACKGROUND OF THE INVENTION

Fuel cells are electrochemical cells that are being developed for motive and stationary electric power generation. One fuel cell design uses a solid polymer electrolyte (SPE) membrane or proton exchange membrane (PEM), to provide ion transport between the anode and cathode. Gaseous and liquid fuels capable of providing protons are used. Examples include hydrogen and methanol, with hydrogen being favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. Each electrode has carried finely divided catalyst particles (for example, platinum particles), supported on carbon particles, to promote ionization of hydrogen at the anode and reduction of oxygen at the cathode. Protons flow from the anode through the ionically conductive polymer membrane to the cathode where they combine with oxygen to form water, which is discharged from the cell. Conductor plates carry away the electrons formed at the anode.

Currently, state of the art PEM fuel cells utilize a membrane made of perfluorinated ionomers such as DuPont's Nafion®. The ionomer carries pendant ionizable groups (e.g. sulfonate groups) for transport of protons through the membrane from the anode to the cathode.

A significant problem hindering the large scale implementation of fuel cell technology is the loss of performance during extended operation, the cycling of power demand during normal automotive vehicle operation as well as vehicle shutdown/start-up cycling. This invention is based on the recognition that a considerable part of the performance loss of PEM fuel cells is associated with the degradation of the oxygen reduction electrode catalyst. This degradation is probably caused by growth of platinum particles, dissolution of platinum particles, and corrosion of the carbon support material. The presence of sulfonate groups and water in the cell creates an acidic environment that contributes to these changes in the electrodes of each cell.

Carbon has been found to corrode severely at electrical potentials above 1.2V and the addition of platinum particles onto the surface of the carbon increases the corrosion rate considerably at potentials below 1.2V. These processes lead to a loss in active surface area of the platinum catalyst that leads to loss in oxygen electrode performance. However, cycling experiments have revealed that the loss of hydrogen adsorption area alone cannot explain the loss in oxygen reduction activity. Additional factors include interference from adsorbed OH species and a possible place-exchange of adsorbed OH species that can alter the electrocatalytic properties of the platinum catalyst towards oxygen reduction. Thus, the specific interaction of platinum with the catalyst support can have an enormous influence on the stability of performance of the Pt electrocatalyst.

SUMMARY OF THE INVENTION

In accordance with this invention, carbon is replaced as a support material for catalyst particles used at the cathode, or both electrodes, of the fuel cell. Titanium carbide and/or titanium nitride are used because they have suitable electrical conductivity (i.e. resistivity in the range 3 to 300 $\mu\Omega$cm) and outstanding oxidation resistance and acid corrosion resistance. The unique properties of titanium carbide and/or titanium nitride catalyst support materials, especially as nanosized particles, can lead to enhanced catalytic behavior as well as increased durability of the fuel cell electrodes. They display good resistance to acids such as sulfuric acid in the fuel cell environment. Carbon (preferably carbon particles) is mixed or dispersed with the catalyst-bearing titanium compound particles. But the carbon does not carry the catalyst and does not come into contact with it.

These specific titanium compounds are adapted for use as supports for catalysts in fuel cells. Thus, the membrane electrode assembly in each cell of a hydrogen-oxygen fuel cell stack would include a suitable proton exchange membrane with a thin hydrogen oxidation anode on one side and an oxygen reduction cathode on the other side. In at least the cathode, or in both electrodes, the catalyst is supported on nanometer size particles of titanium carbide or titanium nitride or a mixture of such metal compounds.

In preferred embodiments, composites of carbon and platinized interstitial compounds of nanosized TiC particles or TiN particles are used as the catalyst support material in fuel cell electrodes to promote the interaction of Pt electrocatalyst with the support and prevent its performance degradation during potential cycling. Platinum and platinum-containing alloys are effective and preferred catalysts in fuel cell applications. Other noble metal compositions are also suitable.

The use of titanium carbide and/or titanium nitride catalyst support materials (with non-catalyst bearing carbon) is applicable in low temperature (e.g. less than about 200° C.) acid and alkaline fuel cells. By supporting the catalyst particles on titanium carbide or nitride the corrosion resistance of the cell is improved, and by including carbon in the electrode material the overall performance of the electrode is improved. The carbon, preferably as carbon particles, is mixed with the titanium carbide (or nitride) supported catalyst so that the catalyst particles are not in physical contact with the carbon particles.

Other objects and advantages of the invention will become more apparent from a description of exemplary preferred embodiments, which follow.

BRIEF DESCRIPTION OF THE DRAWINGS

FIG. 4 illustrates the retention of the HAD area with cycle number for an electrode containing a catalyst of platinum deposited on nanosize titanium carbide mixed with a carbon additive material.

FIG. 5 illustrates the decrease of the HAD area as a function of cycle number for an electrode containing a catalyst of platinum deposited on nanosize titanium nitride.

FIG. 6 illustrated the retention of the HAD area with cycle number for an electrode containing a catalyst of platinum deposited on nanosize titanium nitride mixed with a carbon additive material.

DESCRIPTION OF PREFERRED EMBODIMENTS

Many United States patents assigned to the assignee of this invention describe electrochemical fuel cell assemblies having an assembly of a solid polymer electrolyte membrane and electrode assembly. For example, FIGS. 1-4 of U.S. Pat. No. 6,277,513 include such a description, and the specification and drawings of that patent are incorporated into this specification by reference.

Figure 1:
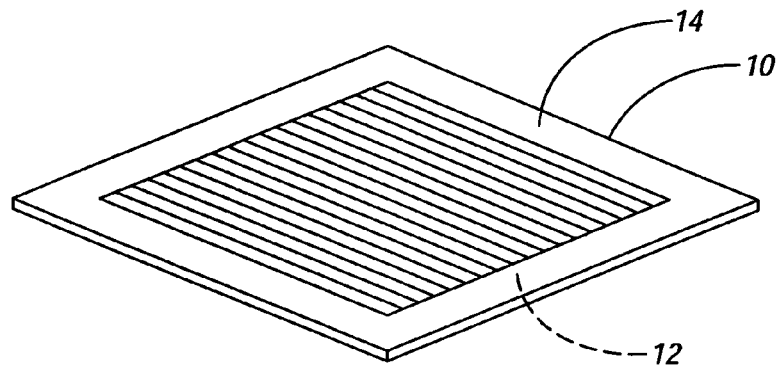
FIG. 1 is a schematic view of a combination of solid polymer membrane electrolyte and electrode assembly (MEA) used in each cell of an assembled fuel cell stack.

FIG. 1 of this application illustrates a membrane electrode assembly 10 which is a part of the electrochemical cell illustrated in FIG. 1 of the +'513 patent. Referring to FIG. 1 of this specification, membrane electrode assembly 10 includes anode 12 and cathode 14. In a hydrogen/oxygen (air) fuel cell, for example, hydrogen is oxidized to H$^+$ (proton) at the anode 12 and oxygen is reduced to water at the cathode 14.

Figure 2:
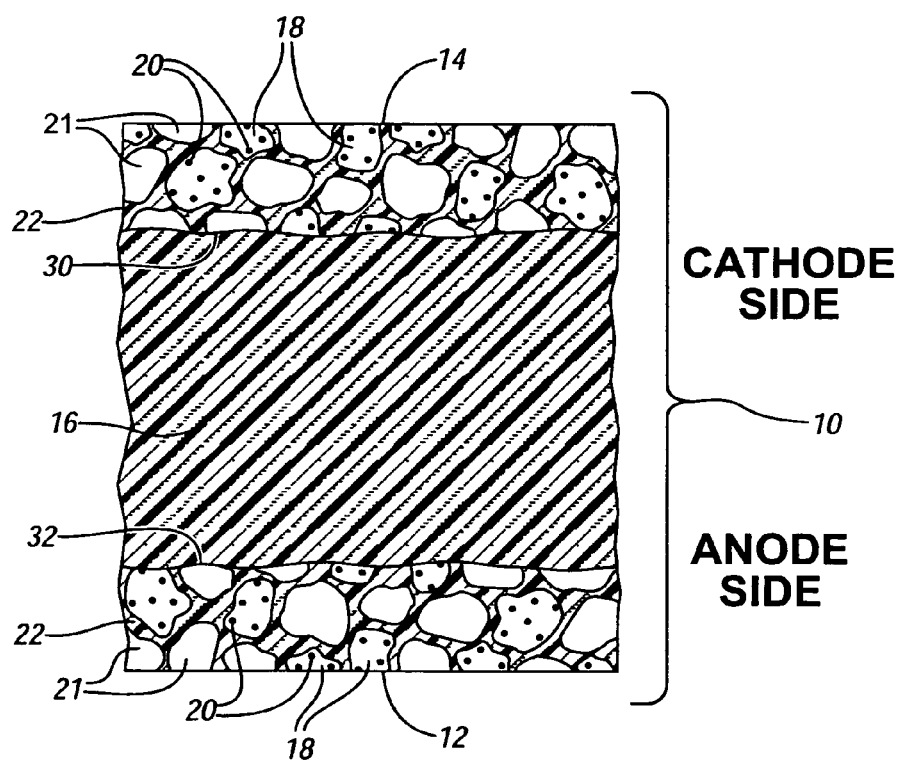
FIG. 2 is an enlarged fragmentary cross-section of the MEA of FIG. 1.

FIG. 2 provides a greatly enlarged, fragmentary, cross-sectional view of the membrane electrode assembly 10 shown in FIG. 1. In FIG. 2, anode 12 and cathode 14 are applied to opposite sides (sides 32, 30 respectively) of a proton exchange membrane 16. PEM 16 is suitably a membrane made of a perfluorinated ionomer such as DuPont's Nafion®. The ionomer molecules of the membrane carry pendant ionizable groups (e.g. sulfonate groups) for transport of protons through the membrane from the anode 12 applied to the bottom surface 32 of the membrane 16 to the cathode 14, which is applied to the top surface 30 of the membrane 16. In an exemplary cell, the polymer electrolyte membrane may have dimensions of 100 mm by 100 mm by 0.05 mm. As will be described, the anode 12 and cathode 14 are both thin, porous electrode layers prepared from inks and applied either directly to the opposite surfaces 30, 32 of the PEM 16 through decals, or applied on a (carbon sheet) current collector.

In accordance with this invention, cathode 14 suitably includes nanometer size catalyst support particles 18 of titanium carbide and/or titanium nitride. Nanometer size includes particles having diameters or largest dimensions in the range of about 1 to about 100 nm. Catalyst support particles 18 carry smaller particles 20 of a reduction catalyst for oxygen, such as platinum. The platinized support particles 18 are embedded in a suitable conductive matrix material 22. In this embodiment, the matrix material 22 is suitably a proton conductive, perfluorinated ionomer material like the polymer electrolyte membrane 16 material. The matrix material may also contain an electron conducting material such as carbon particles 21. In accordance with this invention the carbon particles 21. A mixture of the platinum particle 20—bearing catalyst support particles 18 with particles of carbon 21, and the matrix material 22 is suspended in a suitable volatile liquid vehicle and applied to surface 30 of proton exchange membrane 16. The vehicle is removed by vaporization and the dried cathode 14 material further pressed and baked into surface 30 of PEM 16 to form cathode 16.

In contrast to prior art membrane electrode assemblies, assembly 10 preferably contains carbon particles 21 in the cathode layer 14 mixed with platinum catalyst particles 20 deposited on titanium carbide particles and/or titanium nitride particles 18. In this example, durable and electrically conductive titanium carbide particles 18 replace the carbon catalyst support particles in the cathode 14. In the FIG. 2 embodiment of the invention, the anode 12 is constructed of the same materials as cathode 14. But anode 12 may employ carbon or a different non-carbon catalyst support and catalyst than used in this example.

Titanium carbide and/or titanium nitride particles 18 are used as the catalyst-support particles for at least the cathode side 14 of the cell 10. In a preferred embodiment carbon particles such as Vulcan XC-72R are mixed with the catalyst-carrying TiC or TiN particles. A weight ratio of Pt/TiC (for example) to carbon of about 70:30 is preferred. Mixtures of catalyst bearing titanium compound and carbon having weight ratios, respectively, from 5:95 to 95:5 are suitable. Other carbon materials may be mixed with the catalyst-on-titanium carbide or titanium nitride particles.

As stated, the purpose of replacing carbon as the catalyst support material in the membrane electrode assembly with TiC and/or TiN is to improve the effective operating life of the cell. The oxygen reduction performance of the catalyst can thus be stabilized during load cycling and stop-start cycling of fuel cells for automotive and other applications. Since carbon corrosion is the major factor that limits the useful life of a fuel cell cathode, the replacement of a carbon catalyst support with TiC or TiN improves the life of fuel cell cathodes.

As stated above, titanium carbides and titanium nitrides exhibit electrical conductivities akin to metals (i.e. resistivity in the range 3 to 300 μΩcm) as well as outstanding chemical oxidation and corrosion resistance. The unique and useful properties of these materials, especially as nanosized particles, can lead to enhanced catalytic behavior as well as increased durability of the fuel cell electrodes.

Chemical and electrochemical corrosion tests in a simulated fuel cell environment (0.5M $H_2SO_4$ aqueous solution at 95° C.) have been performed on several of these materials.

The hydrogen adsorption area of electrodes made with platinum deposited on titanium carbide, as well as titanium nitride, have been measured during 500 electrochemical cycles in the potential range 0 to 1.2 V/rhe (where "rhe" refers to the electrochemical potential of a reversible hydrogen electrode) at an applied electrical potential scan rate of 10 mV/s.

Chemical corrosion rates in aqueous 0.5M $H_2SO_4$ at room temperature for titanium carbide and titanium nitride are listed in Table 1.

TABLE 1

| Material | TiN | TiC |
|---|---|---|
| Dissolution Rate, $\mu mole\ m^{-2}\ week^{-1}$ | 3.9 | 5.6 |

As an example of embodiments of this invention, a catalyst comprising platinum particles deposited on particles of titanium carbide was prepared and, in similar manner, a catalyst comprising platinum particles on particles of titanium nitride. For example, the preparation included using hydrazine to reduce chloroplatinic acid in the presence of carbon monoxide to produce platinum nanoparticles on titanium carbide particles of 100 nm particle size. Specifically, 1.00 g of TiC (20 $m^2$/g) was mixed with 1.80 g of $H_2PtCl_6$ in 170 ml $H_2O$. The pH was adjusted to 5 with 1M NaOH and the mixture was sonicated for 15 minutes. The mixture was then stirred while CO was bubbled through the solution at 200 sccm for 15 minutes. A solution of 0.21 g of hydrazine hydrate in 10 ml was added drop-wise to the reaction mixture and the CO bubbling was continued for an hour. The CO flow was then reduced to 50 sccm and the mixture was allowed to continue to react for 16 hours. Very small particles of platinum (3.2 nm average) were deposited on the nanosized titanium carbide particles. Similar catalysts comprising small particles of platinum on nanosize titanium nitride particles were prepared. The supported catalyst product was filtered and washed with copious amounts of water before being allowed to air dry. Final drying was accomplished at room temperature under vacuum. The platinum catalyst had a hydrogen adsorption area of 30 $m^2$/g.

A comparison between the electrochemical corrosion rates for a commercially available platinized carbon benchmark catalyst and the above prepared platinized titanium carbide at T=95° C. in a 0.5M $H_2SO_4$ solution and electrical potentials of 1.2 V and 1.4 V are given in Table 2. While the corrosion of the carbon support leads to mass loss through $CO_2$ or CO evolution, corrosion in TiC leads to mass gain due to the formation of $TiO_2$ Formation of titanium oxide can have a beneficial effect on the performance of the fuel cell by stabilizing the platinum particles, reducing particle growth, and enhancing the interaction of Pt with titanium oxide that leads to improved oxygen reduction catalysis.

TABLE 2

| Material | Platinum on Carbon | Pt on TiC |
|---|---|---|
| Corrosion Rate at E = 1.2 V, $\mu mole\ m^{-2}\ hr^{-1}$ | −1.8 | +20 |
| Corrosion Rate at E = 1.4 V, $\mu mole\ m^{-2}\ hr^{-1}$ | −15 | +19 |

Figure 3:
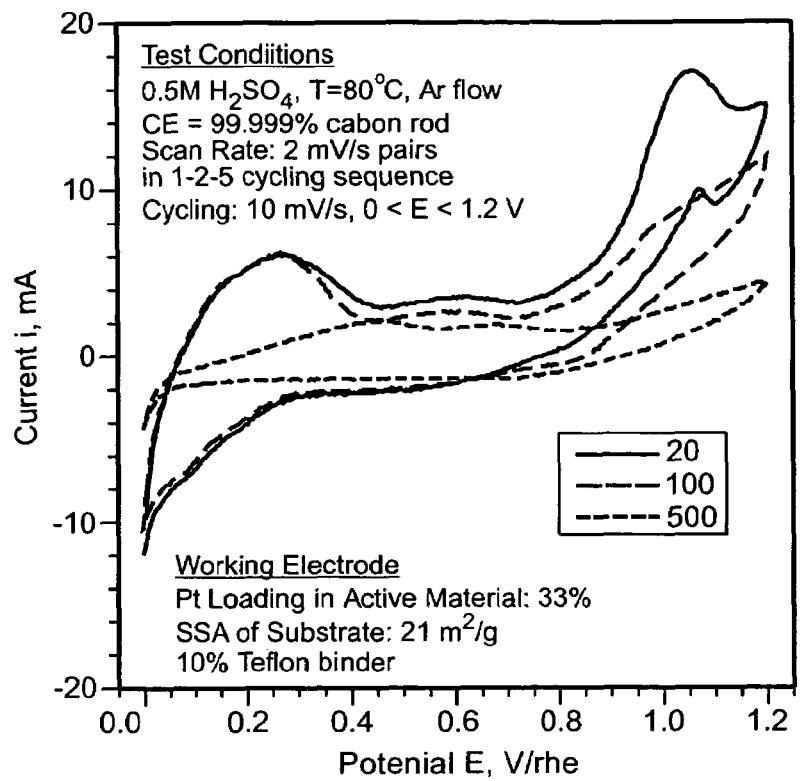
FIG. 3 is a graph of three cyclic voltammograms, after 20 cycles, 100 cycles and 500 cycles, representing the electrical current (i, mA) vs. electrical potential (E, V/rhe) of a cell including a platinum-on-nanosize titanium carbide electrode and a reversible hydrogen electrode (rhe). The plot of these three CV cycles illustrates the decrease of the hydrogen adsorption (HAD) area of the Pt/TiN electrode as a function of cycle number. The HAD area is determined from the charge passed between 0.35 V and 0.05 V during a cathodic (decreasing) potential scan. This charge is given by the area of the voltammogram delimited by 0.05 V and 0.35 V at negative current (i.e. recorded during the decreasing portion of the cyclic potential scans), minus a correction for the contribution from the double layer capacitance.
Figure 4:
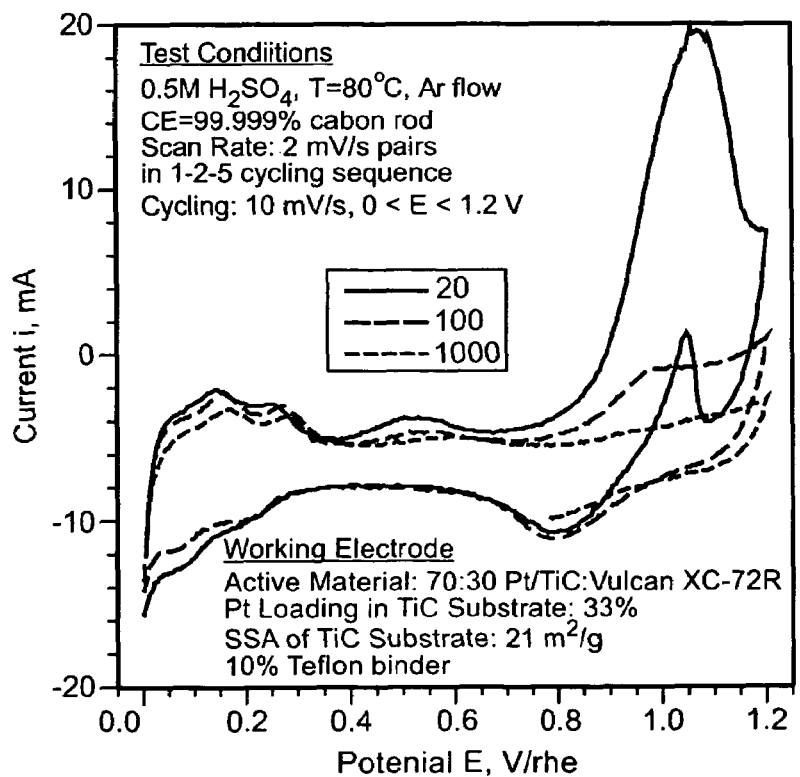
FIG. 4 is a graph of three cyclic voltammograms, after 20 cycles, 100 cycles and 1000 cycles, representing the electrical current (i, mA) vs. electrical potential (E, V/rhe) of a cell including an electrode formed of platinum-on-nanosize titanium carbide mixed with high surface area carbon particles, and a reversible hydrogen electrode (rhe).
Figure 5:
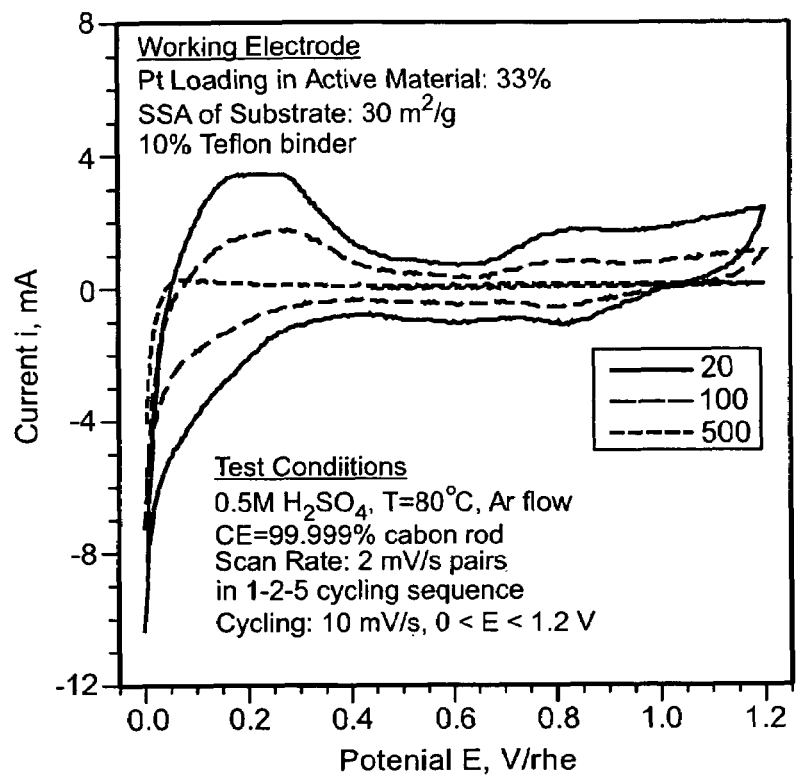
FIG. 5 is a graph of three cyclic voltammograms, after 20 cycles, 100 cycles and 500 cycles, representing the electrical current (i, mA) vs. electrical potential (E, V/rhe) of a cell including a platinum-on-nanosize titanium nitride electrode and a reversible hydrogen electrode (rhe).
Figure 6:
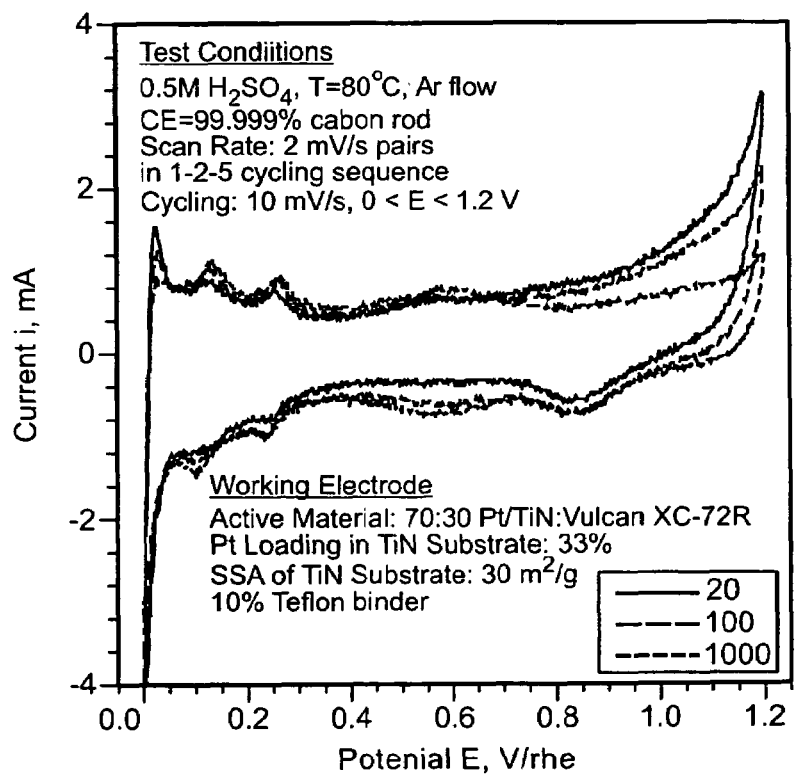
FIG. 6 is a graph of three cyclic voltammograms, after 20 cycles, 100 cycles and 1000 cycles, representing the electrical current (i, mA) vs. electrical potential (E, V/rhe) of a cell including an electrode formed of platinum-on-nanosize titanium nitride mixed with high surface area carbon particles, and a reversible hydrogen electrode (rhe).

FIGS. 3, 4, 5 and 6 represent cyclic voltammograms collected at a scan rate of 2 mV/s in 1-2-5 steps during potential cycling of several working electrodes at a scan rate of 10 mV/s between the potential limits of 0 and 1.2 V vs. a reversible hydrogen electrode (abbreviated as "V/rhe" henceforth) at a temperature of 80° C. The region of the voltammograms from 0 to 0.35 V/rhe corresponds to the adsorption and desorption of hydrogen, respectively for a scan with decreasing (cathodic scan) and increasing (anodic scan) values of the potential. The area between 0.05 and 0.35 V in the cathodic scan can be used for determining the hydrogen adsorption (HAD) area of the catalyst, after subtracting the contribution from the double layer charge/discharge. The HAD area represents a measure for the catalytically active area of a material. FIGS. 3 and 5 clearly show that the use of platinum on titanium carbide alone (i.e. without carbon particles in the electrode) or platinum on titanium nitride alone suffers from a major deficiency: the HAD area, and therefore the catalytic activity, for both platinized TiC and platinized TiN collapses after 500 cycles. The addition of carbon mixed with the catalyst-bearing titanium carbide or titanium nitride, however, greatly improves HAD retention both for Pt/TiC and Pt/TiN, as shown in FIGS. 4 and 6.

The data presented in FIGS. 3, 4, 5 and 6 was collected for working electrodes in the form of pellets connected to gold current collectors through the application of pressure. The pellets were made through a roll and paste method from Pt/TiC or Pt/TiN catalyst, both and without a carbon additive, and 10% Teflon binder. Each pellet electrode was then cycled at a constant scan rate of 10 mV/s in a 3-electrode cell comprised of said working electrode, a carbon counter electrode and a sealed hydrogen reference electrode. The cell was filled with an aqueous 0.5M $H_2SO_4$ solution held at a constant temperature of 80° C. and was de-aerated by bubbling argon through the electrode over the entire duration of the experiment. Cyclic voltammograms at a lower scan rate of 2 mV/s were collected in 1-2-5 steps during the potential cycling, in order to examine the evolution of the HAD area with cycle number.

It is seen that both titanium carbide and titanium nitride provide good corrosion resistance as catalyst supports in the fuel cell environment. And the use of platinum particles on titanium carbide particles and titanium nitride particles as a fuel cell catalyst has been described for purposes of an illustrative example. These titanium compound catalyst carriers may be used in both the anode and cathode electrodes of the fuel cell but provide especially good corrosion resistance in the corrosive oxygen-reducing part of the cell (i.e., the cathode). Better catalytic performance is retained when the catalyst on-titanium compound carrier is mixed with carbon. Carbon particles are preferred. It is further preferred that an electrode material comprising the catalyst-on-titanium compound particles and carbon be bound with a polymer binder materials such as a material like the membrane material used in the cell. The invention is applicable for use in low temperature (operating at less than about 200° C.) acid and alkaline fuel cells.

The invention claimed is:
1. An acid or alkaline fuel cell operating at a temperature no higher than about 200° C. and comprising:
   a polymer electrolyte membrane sandwiched between an anode and an oxygen-reducing cathode;
   the oxygen-reducing cathode comprising particles of an oxygen-reducing catalyst carried on nanometer size catalyst support particles, and carbon, in which none of the carbon in the cathode carries the oxygen-reducing catalyst; the catalyst support particles consisting essentially of at least one of titanium carbide and titanium nitride, and the carbon being inter-dispersed with the catalyst support particles.

2. A fuel cell as recited in claim 1 in which the oxygen-reducing cathode further comprises a polymeric binder for catalyst-on-support particles and the carbon.

3. A fuel cell as recited in claim 1 in which the oxygen-reducing catalyst comprises a noble metal.

4. A fuel cell as recited in claim 1 in which the oxygen-reducing catalyst comprises platinum or a platinum-containing alloy.

5. A fuel cell as recited in claim 1 in which the carbon comprises carbon particles.

6. A fuel cell comprising:
   a polymer electrolyte membrane sandwiched between a hydrogen-oxidizing anode and an oxygen-reducing cathode;
   the hydrogen-oxidizing anode comprising particles of a hydrogen-oxidizing catalyst carried on catalyst support particles, the catalyst support particles consisting essentially of at least one of titanium carbide and titanium nitride; and
   the oxygen-reducing cathode comprising particles of an oxygen-reducing catalyst carried on catalyst support particles, and carbon; the catalyst support particles consisting essentially of at least one of titanium carbide and titanium nitride, the carbon being inter-dispersed with the catalyst support particles, and the oxygen-reducing catalyst particles not being in contact with the carbon.

7. A fuel cell as recited in claim 6 in which the oxygen-reducing cathode further comprises a polymeric binder for catalyst-on-support particles and the carbon.

8. A fuel cell as recited in claim 6 in which the oxygen-reducing catalyst comprises a noble metal.

9. A fuel cell as recited in claim 6 in which the oxygen-reducing catalyst comprises platinum or a platinum-containing alloy.

10. A fuel cell as recited in claim 6 in which the carbon comprises carbon particles.

* * * * *